United States Patent
Warnakulasooriya et al.

(10) Patent No.: US 7,173,787 B1
(45) Date of Patent: Feb. 6, 2007

(54) APPARATUS AND METHOD FOR CONTROLLING DISK DRIVE SPIN UP

(75) Inventors: Bernard Warnakulasooriya, Franklin, MA (US); Steven D. Sardella, Marlborough, MA (US); Mickey Felton, Sterling, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 11/094,024

(22) Filed: Mar. 30, 2005

(51) Int. Cl.
*G11B 15/18* (2006.01)

(52) U.S. Cl. ..................................................... 360/69

(58) Field of Classification Search .................... None
See application file for complete search history.

(56) References Cited

U.S. PATENT DOCUMENTS

| | | | |
|---|---|---|---|
| 5,650,886 A * | 7/1997 | Codilian et al. ......... 360/73.03 |
| 6,966,006 B2 * | 11/2005 | Pacheco et al. ............. 713/300 |
| 7,023,642 B2 | 4/2006 | Suzuki et al. ................. 360/71 |
| 7,068,500 B1 | 6/2006 | Beinor, Jr. et al. ......... 361/685 |
| 2003/0115413 A1 * | 6/2003 | Wood et al. ................. 711/114 |

* cited by examiner

*Primary Examiner*—Hoa T. Nguyen
*Assistant Examiner*—Mitchell Slavitt
(74) *Attorney, Agent, or Firm*—BainwoodHuang

(57) ABSTRACT

Disk drives in a storage system are spun up in sequential stages. During each sequential stage a number of disk drives is spun up based on parameters related to the power requirements of the system. The parameters include the maximum current for the storage system, the number of disk drives currently in steady state, the steady state current required for a disk drive, and the spin up current required for a disk drive. High availability features are provided as further aspects of the spin up mechanism.

24 Claims, 14 Drawing Sheets

Cmax = 34
Ccc = 2
Css = 1.6
Csu = 4

| STAGE | t0 | t1 | t2 | t3 | |
|---|---|---|---|---|---|
| Nc | 0 | 8 | 12 | 14 | DRIVES AT STEADY STATE |
| Nn | 8 | 4 | 2 | 2 | MAX. NUMBER OF DRIVES ALLOWED TO TURN ON |

Nn = INTEGER ((Cmax - Ccc - (Nc * Css))/Csu)

FIG. 5

POWER BRANCH A
Cmax = 17
Ccc = 1
Css = 1.6
Csu = 4

POWER BRANCH B
Cmax = 17
Ccc = 1
Css = 1.6
Csu = 4

| STAGE | POWER BRANCH A | | | | |
|---|---|---|---|---|---|
| | t0 | t1 | t2 | t3 | |
| Nc | 0 | 4 | 6 | 7 | DRIVES AT STEADY STATE |
| Nn | 4 | 2 | 1 | 1 | MAX. NUMBER OF DRIVES ALLOWED TO TURN ON |

| STAGE | POWER BRANCH B | | | | |
|---|---|---|---|---|---|
| | t0 | t1 | t2 | t3 | |
| Nc | 0 | 4 | 6 | 7 | DRIVES AT STEADY STATE |
| Nn | 4 | 2 | 1 | 1 | MAX. NUMBER OF DRIVES ALLOWED TO TURN ON |

Nn = INTEGER ((Cmax - Ccc - (Nc * Css))/Csu)

FIG. 6

POWER BRANCH A

Cmax = 17
Ccc = 1
Css = 1.6
Csu = 4

POWER BRANCH B

Cmax = 17
Ccc = 1
Css = 1.6
Csu = 4

| STAGE | | t0 | t1 | t2 | t3 | t4 | t5 |
|---|---|---|---|---|---|---|---|
| Nc | BRANCH A | 0 | 2 | 4 | 4 | 5 | 6 |
| Nn | | 2 | 2 | 0 | 1 | 1 | 1 |
| Nc | BRANCH B | 0 | 4 | 4 | 6 | 7 | |
| Nn | | 4 | 0 | 2 | 1 | 1 | |

Nn = INTEGER ((Cmax - Ccc - (Nc * Css))/Csu)

FIG. 8

| TIME | t=0 | t=0.5 | t=1 | t=1.5 | t=2 | t=2.5 | t=3 | t=3.5 | t=4 | t=4.5 | t=5 | t=5.5 |
|---|---|---|---|---|---|---|---|---|---|---|---|---|
| CONTROL CARD A | | | A | | B | | C | | D | | E | |
| CONTROL CARD B | | | | A | | B | | C | | D | | E |

FIG. 10

| TIME | t=0 | t=0.5 | t=1 | t=1.5 | t=2 | t=2.5 | t=3 | t=3.5 | t=4 | t=4.5 | t=5 | t=5.5 |
|---|---|---|---|---|---|---|---|---|---|---|---|---|
| CONTROL CARD A | | | A | | B | | | | | | | |
| CONTROL CARD B | | | | A | | B | | C | | D | | E |

FIG. 11

APPARATUS AND METHOD FOR CONTROLLING DISK DRIVE SPIN UP

FIELD OF THE INVENTION

The present invention relates generally to the field of storage systems, and particularly to mechanisms for controlling the timing of disk drive spin up in a storage system that supports many disk drives.

BACKGROUND OF THE INVENTION

Today's storage systems are used in computing environments for generating and storing large amounts of critical data. The storage capacity of these systems has increased over time such that some storage systems support many—sometimes hundreds—of disk drives. Because disk drives are mechanical devices, they have higher peak power requirements than the other electronic devices in the system. In today's market it is important to design the power subsystem portion of a storage system to support the maximum and peak power requirements of the system while minimizing the cost of the system.

A typical disk drive consists of circuit board logic and a Hard Disk Assembly (HDA). The HDA portion of the disk drive includes the spindles platters, head arm and motor that make up the mechanical portion of the disk drive. When power is applied to the disk drive, the circuit board logic powers up and the HDA spins up. During spin up, the HDA requires a higher current than when it is in steady state—i.e. already spun up. This extra current is typically more than two times the steady state current. Therefore, if a storage system at power up attempts to spin up all the drives in the system at the same time, the system is required to support a peak power level that is much greater than the maximum power required to operate at steady state. The more disk drives the system supports, the greater the peak power requirement. It is too expensive to provide a power subsystem that can support enough peak power to power up all disk drives at once, especially when the excess power is not otherwise needed.

Some types of disk drives offer a separate HDA power input but no built in control over the timing of the application of power to the HDA. Some other types offer limited control. For example, Fibre Channel disk drives compliant with the SFF-8045 rev. 4.7 standard allow the timing of HDA spin up to be controlled via two signal pins, Start_1 and Start_2, that allow the HDA to spin up based on three different conditions. Depending on the state of the Start_1 and Start_2 signals, the disk drive HDA will start drawing current either 1) immediately; 2) after it receives its first SCSI command, or 3) based on its arbitrated loop physical address (ALPA). This provides limited means to stagger the timing of spin up amongst all the drives such that system peak power requirements can be minimized.

However, it is difficult for system software to use SCSI commands to control drive spin up timing, because insert and power control signals from the drives are asserted much faster than software can respond. The ALPA address method is also disadvantageous in some circumstances. Consider a storage system capable of supporting 48 disk drives. If a user plugs a single disk drive into the $48^{th}$ slot in a system wherein the other drives are all at steady state, there is no reason why the drive should not spin up immediately. But because its spin up timing depends on its ALPA address, it will nonetheless take several minutes to spin up.

What is needed is a mechanism for controlling the application of power to the HDA portion of disk drives in a storage system. The mechanism must be more efficient than current methods and applicable regardless of the type of disk drives employed.

SUMMARY OF THE INVENTION

In accordance with the principles of the invention, disk drives in a storage system are spun up in sequential stages. During each sequential stage a number of disk drives are spun up based on parameters related to the power requirements of the system. The parameters include the maximum current for the storage system, the number of disk drives currently in steady state, the steady state current required for a disk drive, and the spin up current required for a disk drive.

More particularly, the number of disk drives to spin up in a stage is calculated as: (the maximum current for the storage system minus current used by logic in the system–(the number of disk drives currently in steady state times the steady state current required for a disk drive)) divided by the spin up current required for a disk drive.

Control logic for spinning up the drives produces Spin-up signals, wherein one of the Spin-up signals is asserted in each sequential stage. The Spin-up signal asserted in a stage causes a number of disk drives of the plurality of disk drives to spin up during the stage.

According to an aspect of the invention, second control logic produces second Spin-up signals corresponding to the first Spin-up signals. The second Spin-up signals are wire-or'd with the first Spin-up signals.

According to another aspect of the invention, the first control logic further includes registers corresponding to the Spin-up signals. Each Spin-up signal is an output from a corresponding register. A redundant plurality of power rails and a plurality of drivers are provided. Each Spin-up signal is coupled to one or more drivers. A first group of drivers is coupled to a first of the plurality of power rails and a second group of drivers is coupled to a second of the plurality of power rails.

According to a further aspect of the invention, disk drives inserted into an already powered up system are spun up in stages. Each disk drive provides a presence signal that is asserted when the disk drive is present. The first control logic provides a power control signal for each disk drive that causes power to be applied to the disk drive when the power control signal is asserted. The first control logic operates to monitor the presence signals. For each disk drive, if the presence signal is deasserted, the power control signal is deasserted. If any deasserted presence signal becomes asserted for a disk drive, assert the power control signal for the disk drive. If more than two deasserted presence signals become asserted for more than two corresponding disk drives, the first control logic asserts the power control signals for the corresponding drives in sequential stages.

The various aspects of the invention are employed to spin up groups of drives sequentially, and is applicable to all types of drives. Features of the invention provide high availability for the system during drive spin up.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 5 is a table showing the iterative solutions to a formula for determining how many disk drives to spin up in accordance with the invention.

FIG. 6 shows tables for the iterative solutions in a storage system having dual power rails.

FIG. 8 is a table showing alternative spin up staging for a system with the same power parameters as those of FIGS. 4 and 7.

FIG. 10 is a table showing the effect of adding a control card to the system of FIG. 9 during disk drive spin up.

FIG. 11 is a table showing the effect of removing a control card from the system of FIG. 9 during disk drive spin up.

DETAILED DESCRIPTION OF EXEMPLARY EMBODIMENTS

Figure 1:
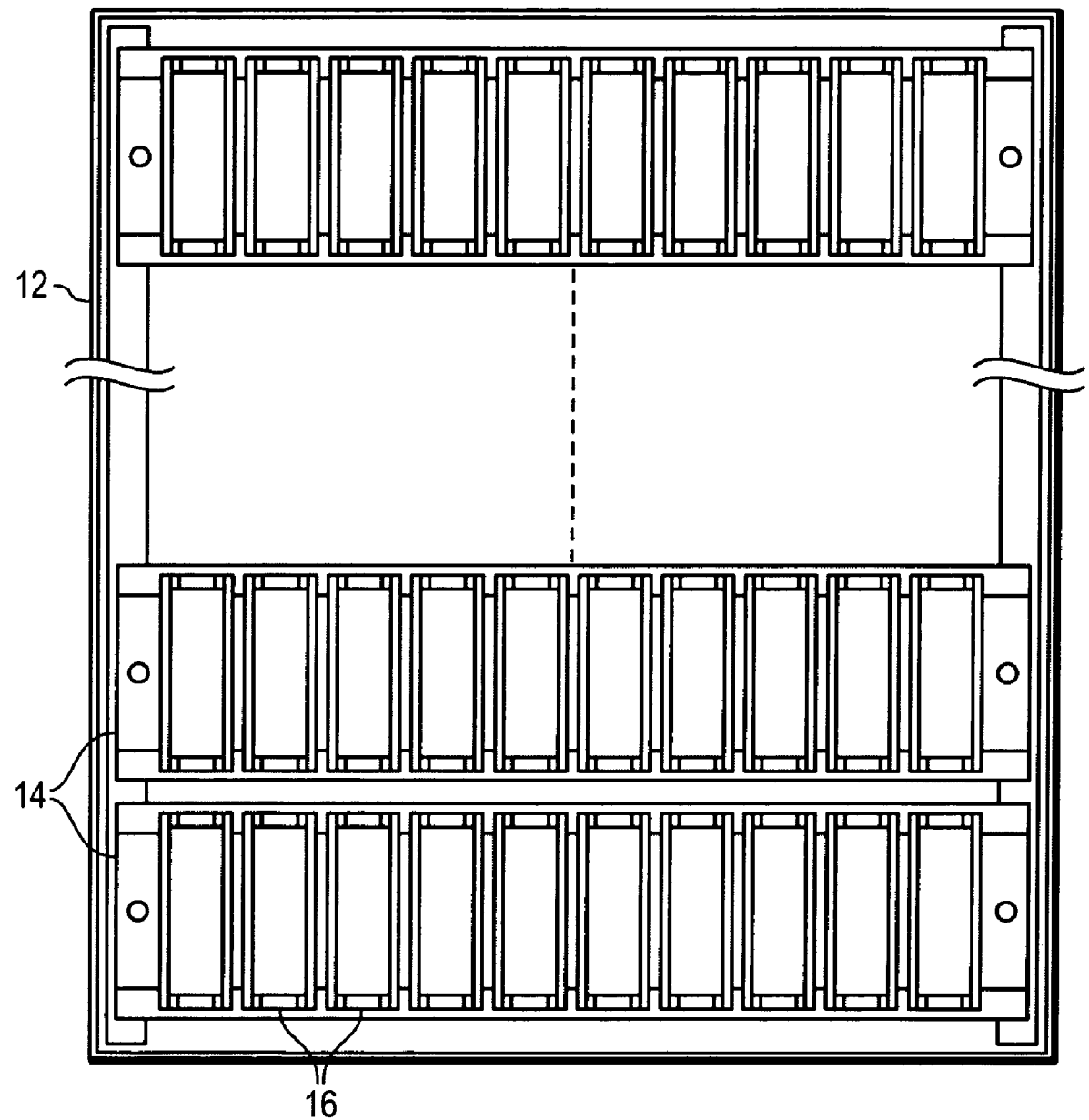
FIG. 1 is a representation of a rack of storage systems in which the invention is employed.

Referring to FIG. 1, there is shown an example of a rack mount system 10 in which the present invention can be employed. A rack mount cabinet 12 includes several storage systems 14. Each storage system 14 has installed therein several disk drives 16. The amount of storage in the multi-chassis system can be increased by adding new storage systems 14 to the rack mount system 10, and by adding more disk drives 16 to one or more of the storage systems 14.

Figure 2:
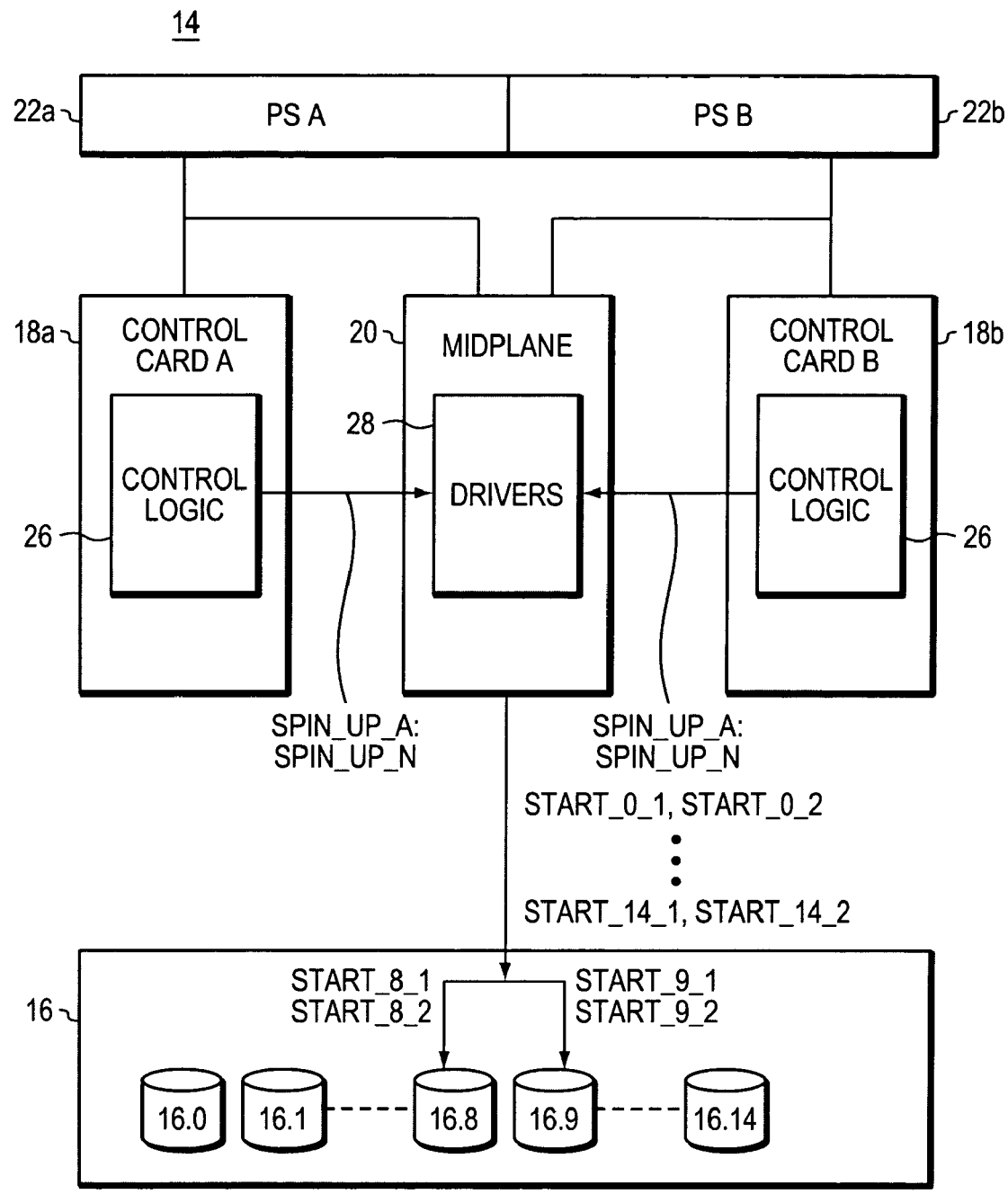
FIG. 2 is a schematic representation of components of a storage system of FIG. 1, showing control logic for controlling the spin up of disk drives.

A functional block diagram of one of the storage systems 14 is shown in FIG. 2. The storage system 14 includes two redundant control cards 18a and 18b to provide high availability of the system. The control cards 18a,b are coupled to a midplane 20. Disk drives 16, herein shown as 15 disk drives 16.0–16.14, are also coupled to the midplane 20. Each control card 18a,b communicates with all the drives 16.0–16.14 via the midplane 20. Power is supplied to the control cards 18a,b, the midplane 20, and the disk drives 16 by a redundant set of power supplies 22a,b.

Since each storage system 14 can include up to 15 disk drives 16, it is not reasonable to provide power supplies 22a,b with enough peak power to spin up all 15 disk drives at once. Therefore, in accordance with the principles of the invention, the disk drives 16 are spun up in sequential stages. During each sequential stage a certain number of disk drives 16 are spun up based on parameters related to the power requirements of the system as will be further described. This allows the system 14 to stagger the timing of spin up amongst all the drives 16 such that system peak power requirements can be minimized.

Figure 3:
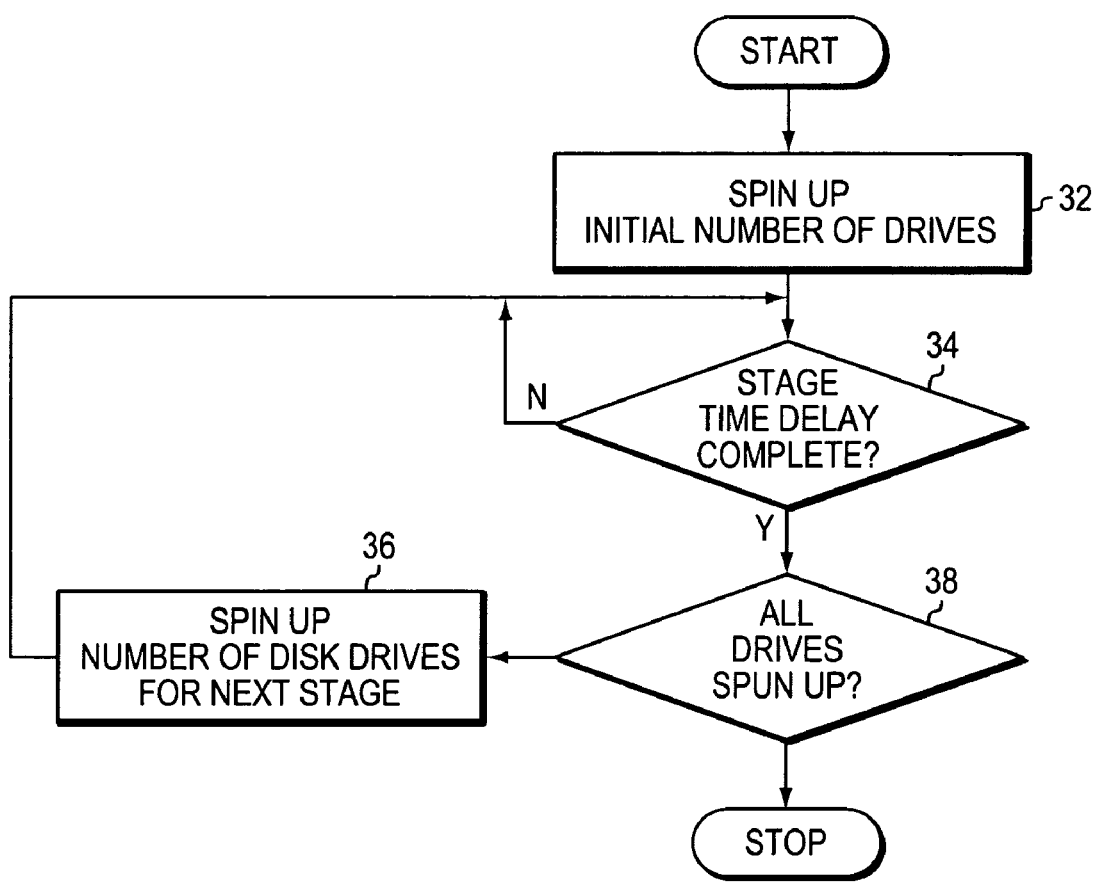
FIG. 3 is a flow diagram showing the operation of the control logic of FIG. 2.

More particularly, in accordance with the invention, a certain number of disk drives 16 are spun up in each of several successive stages. The control logic 26 controls the timing of disk drive spin up. For example, as shown in FIG. 3, during a first stage, the control logic 26 causes a first number of disk drives 16 to spin up (step 32). The control logic 26 then waits for a period of time, typically about 12 seconds, sufficient for the disk drives 16 to reach steady state (step 34). During a next stage a second number of disk drives 16 is spun up (step 36). The remaining drives 16 are spun up during successive sequential stages until all drives have been spun up (step 38). Various system parameters are input to a formula that determines how many drives 16 should be spun up during a stage. The formula takes into account: the maximum steady state current in a system 14; the peak available current in a system 14; the number of drives 16 to be powered up in the system 14; the spin up current requirement per drive 16; the steady state current per drive 16; and the current used by the control boards 18a, 18b. The following formula is iteratively solved to calculate the number of drives that should be spun up in each successive stage:

Cpeak=peak current available in chassis
Cmax=maximum steady state current in chassis
Ccc=control card current
Nc=number of drives currently on at steady state
Css=steady state current per drive
Csu=spin up current per drive
Nn=number of drives to spin up in next stage $$Nn=\text{Integer}((Cmax-Ccc-(Nc*Css))/Csu) \quad (24)$$

In the generalized embodiment shown in FIG. 2, each controller board 18a, 18b includes identical control logic 26 for driving Spin-up signals Spin-up_A–Spin-up_N to drivers 28 on the midplane 20. The disk drives 16 are herein shown to be Fibre Channel drives. A Fibre Channel drive accepts as input two Start signals that switch on power to the HDA portion of the drive. (Start signals are referred to collectively; individual Start signals are referred to with a suffix.) The drivers 28 on the midplane 20 drive these pairs of Start signals to each of the drives. As shown, signals Start_8_1 and Start_8_2 are coupled to disk drive 16.8, Start_9_1 and Start_9_2 are coupled to disk drive 16.9. The remaining drives are coupled to their corresponding Start signals in a similar manner. When both Start signals for a given drive are asserted, the HDA portion of the drive spins up. The control logic 26 asserts each of the Spin-up signals Spin-up_A–Spin-up_N during successive stages in accordance with the above formula 24. (Spin-up signals are referred to collectively; individual Spin-up signals are referred to with a capital letter suffix.) The Spin-up signals are used to drive the Start signals that control the spin up of the HDA portions of the drives 16.

Figure 4:
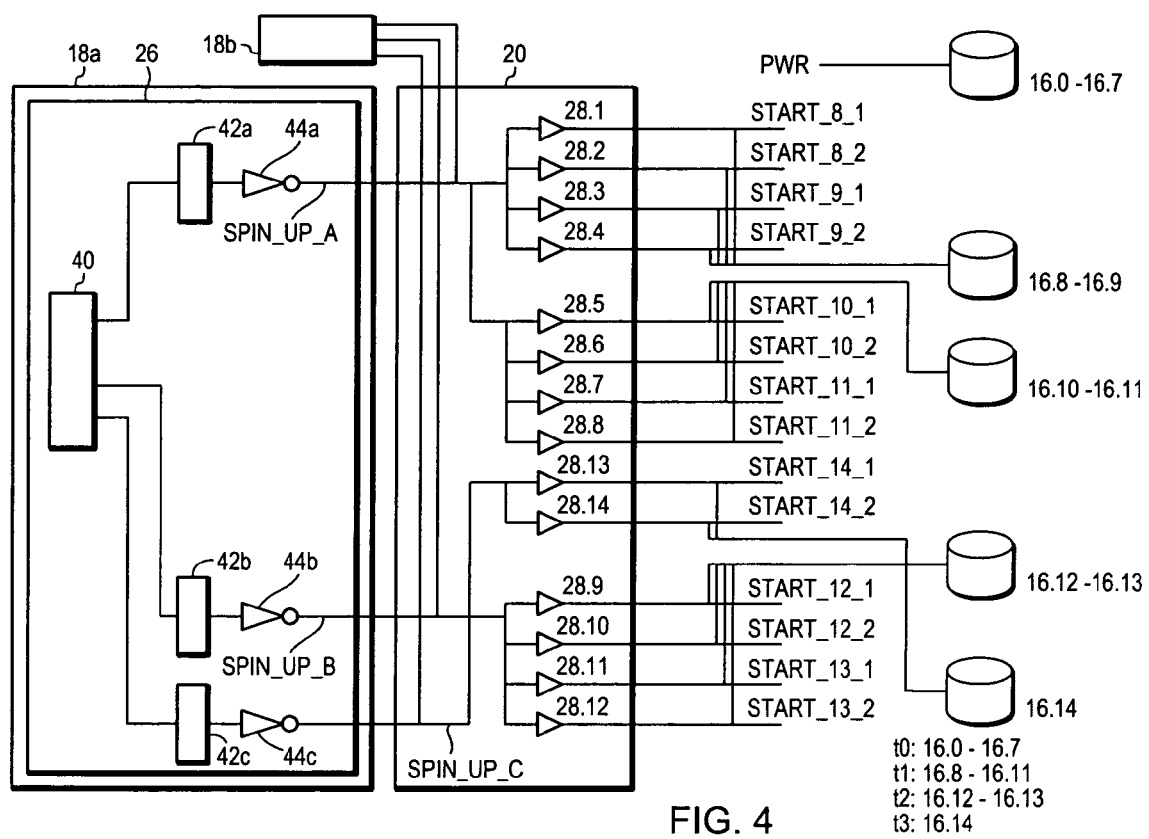
FIG. 4 is a more detailed block diagram of the control logic and midplane drivers of FIG. 2.

Referring to FIG. 4, there is shown one example embodiment of the invention. In this embodiment, the initial parameters are as follows:

Cpeak=42 A
Cmax=34 A
Ccc=2 (1 A per control card)
Css=1.6 A
Csu=4 A

In this embodiment, the system has sufficient maximum power (Cmax) to initially spin up 8 drives at once. (8 drives*4 A per drive=32 A<34A) Therefore drives 16.0–16.7 are shown coupled directly to power. The remaining drives 16.8–16.14 are spun up in a staggered manner in subsequent stages in accordance with the above formula. Solving for Nn shows that 3 subsequent stages are needed to power up all the drives. In FIG. 5, all 4 stages resulting from the solution to the formula are shown. The first, labeled "t0", is the stage in which the initial 8 drives are spun up. During the next stage, "t1", 4 additional drives can be spun up. Then, in stage "t2", 2 more drives can be spun up. In the final stage "t3", the last drive can be spun up.

In FIG. 4 there is shown the control logic 26 and drivers 28 of FIG. 2 as implemented for this embodiment. Since the control logic 26 on the control cards 18a and 18b is the same, only one example of control logic 26 is shown in detail. In the embodiment shown, the Spin-up_A–Spin-up_C and Start_8_1–Start_14_2 signals are active low. Control logic 26 includes spin up logic 40 coupled to single bit registers 42a–42c. Registers 42a–42c are coupled to inverters 44a–44c. The inverters 44a–44c drive the signals Spin-up_A–Spin-up_C to the drivers 28 on the midplane 20. The Spin-up_A–Spin-up_C signals from each controller board 18a and 18b are wire-or'd together on the midplane 20. Therefore, it is preferable to implement the inverters 44a–44c as open collector driver devices with pulled up outputs, particularly in an environment to be later described wherein the control cards 18a and 18b are hot-pluggable. The Spin-up_A signal is coupled to drivers 28.1, 28.2, 28.3, 28.4, 28.5, 28.6, 28.7, and 28.8 which respectively drive the Start signals Start_8_1, Start_8_2, Start_9_1, and Start_9_2, Start_10_1, Start_10_2, Start_11_1 and Start_11_2 to the disk drives 16.8, 16.9, 16.10, and 16.11. The Spin-up_B signal is coupled to drivers 28.9, 28.10, 28.11, and 28.12, which respectively drive the Start signals Start_12_1, Start_12_2, Start_13_1, and Start_13_2 to the disk drives 16.12 and 16.13. The Spin-up_C signal is coupled to drivers 28.13 and 18.14, which respectively drive the Start signals Start_14_1 and Start_14_2 to the disk drive 16.14. The drives 16.0–16.14 are preferably hot-pluggable; therefore, the drivers 28.1–28.14 are also preferably open collector drivers with pulled-up outputs. After the initial 8 drives 16.0–16.7 are spun up during stage "t0", the control logic 26 sequences the assertion of each of the Spin-up signals Spin-up_A–Spin-up_C such that each is asserted one stage after the last, in accordance with the control logic 26 functionality shown in FIG. 3. Drives 16.8–16.14 are thereby spun up in stages as shown in FIG. 5. Thus, as shown in FIGS. 3 and 5 and at the bottom of FIG. 4, the first 8 drives 16.0–16.7 are spun up during stage "t0" (step 32). Then, during stage "t1", the control logic 26a asserts the signal Spin-up_A (step 36), resulting in the assertion of the signals Start_8_1, Start_8_2, Start_9_1, Start_9_2, Start_10_1, Start_10_2, Start_11_1, and Start_11_2 and thus the spin up of drives 16.8, 16.9, 16.10, and 16.11. During stage "t2", the control logic asserts the signal Spin-up_B (step 36), resulting in the assertion of the signals Start_12_1, Start_12_2, Start_13_1, and Start_13_2 and thus the spin up of drives 16.12 and 16.13. During "t3" (step 36), the control logic asserts the signal Spin-up_C, resulting in the assertion of the signals Start_14_1 and Start_14_2 and thus the spin up of the final drive 16.14.

In accordance with further aspects of the invention, the system includes several high availability features. First of all, system peak power (Cpeak), though not part of the formula 24, is sufficient to power up extra drives 16 in case of a short or a stuck bit. Cpeak is therefore a parameter to be considered for high availability purposes. For example, in the system of FIG. 4, if the signals Spin-up_A and Spin-up_B are shorted together, then two extra drives 16.12 and 16.13 will power up during stage "t1". Or, if Spin-up_B is stuck low, then the two extra drives 16.12 and 16.13 will power up during stage "t0". In either case, 8 additional amps will be drawn to spin up drives 16.12 and 16.11. Note that since peak current (Cpeak) is 8 amps greater than maximum current (Cmax), and because staging of spin up has been designed not to exceed maximum current, there will be sufficient peak power to support spin up of the extra two drives 16.12 and 16.13. Thus, no system failures will occur if one of the Spin-up bits Spin-up_A–Spin-up_C is stuck asserted or shorted to one of the others. Furthermore, if any of the outputs of the drivers 28.1–28.14 are stuck asserted, potentially causing a drive to spin up, sufficient peak current is available to prevent a system failure.

For further high availability, each bit register 42 and inverter 44 is implemented as a separate single bit part, rather than as a bit element of a multi-bit register or inverter. So, if a register 42 or inverter 44 fails such that its output is stuck asserted, the result is the same as was described with regard to the Spin-up signals: the resulting spin-up of extra drives 16 again draws less than peak available current and system failures are avoided.

To provide even further high availability, power is provided to the drivers 28 on the midplane 20 on separate power rails. Referring back to FIG. 2, recall that power is provided to the system 14 via two power supplies 22a and 22b. The power supplies are designed such that, when both are operating, each supply 22a and 22b provides half the power for the system. But if one supply 22a or 22b fails, the other supply can provide full power for the system.

It can be seen that the previously presented formula for staging spin up of drives still applies in this environment. As shown in FIG. 6, each supply 22a (labeled "Power Branch A") and 22b (labeled "Power Branch B") supplies one half of Cmax and Cpeak, and supports half the control card 18a,b amps. Each supply also provides half the total drive 16 current—or enough current to power 8 drives. Thus, as shown, each supply can initially spin up 4 drives during stage "t0", 2 during stage "t1", 1 during stage "t2", and 1 during stage "t3". Thus when both supplies are combined in the system the staging of spin up matches that shown in FIG. 5.

Figure 7A:
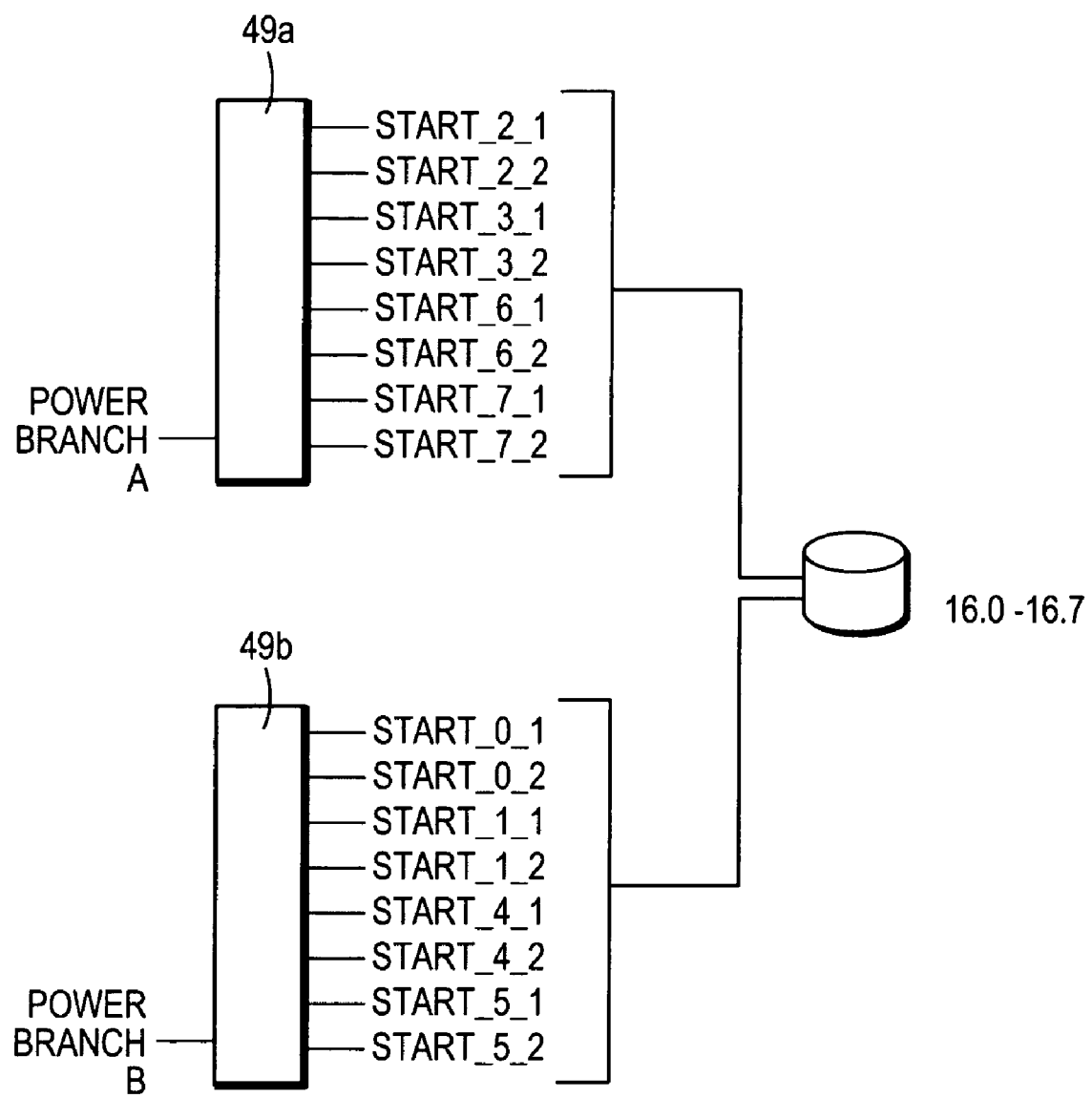
FIG. 7 is a block diagram of the system of FIG. 4 utilizing dual power rails for high availability.
Figure 7B:
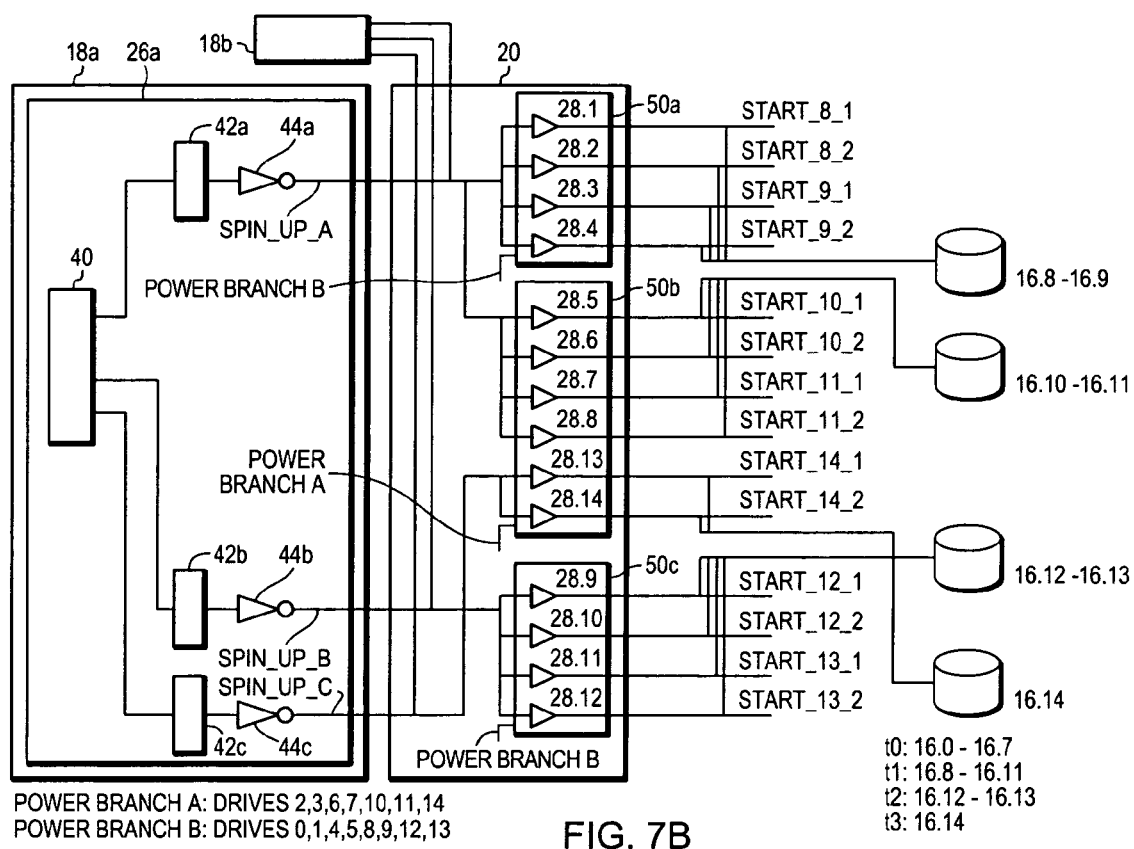

The use of two power supplies 22a and 22b for supplying power on separate power rails provides an extra high availability advantage as shown in FIG. 7. In this arrangement, adjacent pairs of drives 16 receive their Start bits from different rails. As labeled at the bottom of FIG. 7, the Start bits for drives 16.2, 16.3, 16.6, 16.7, 16.10, 16.11, and 16.14 are powered by Power Branch A, while the Start bits for drives 16.0, 16.1, 16.4, 16.5, 16.8, 16.9, 16.12, and 16.13 are powered by Power Branch B. In FIG. 7A, driver 49a drives the Start bits for drives 16.2, 16.3, 16.6, and 16.7 from Power Branch A. Drive 48b drives the Start bits for drives 16.0, 16.1, 16.4, and 16.5 from Power Branch B. In FIG. 7B, each package of drivers, 50a, 50b, and 50c is for example implemented as a Texas Instruments 74LVC06, including 4 or 6 drivers 28. Power rails and Spin-up_A–Spin-up_C signals are coupled to the driver packages 50a–c such that the Start bits to the drives are driven off the power rails Power Branch A or Power Branch B as described. Note that in the example of FIG. 7, the Spin-up_C signal is coupled to the driver package 50b so that the Start_14_1 and Start_14_2 signals are driven from Power Branch A.

It should be noted that the examples shown in FIGS. 4 and 7 minimize the number of stages needed to spin up all the drives 16 in the system by spinning up as many drives 16 per stage as maximum current will allow. In other words, the results of the formula provide a maximum number of drives 16 than can be spun up per stage. There may be reasons other than power considerations for controlling the timing and order in which the drives 16 are spun up. For example, a design may require that certain pairs or groups of drives 16 spin up together. In accordance with the invention, drives 16 can be spun up in any number of stages as long as the maximum number of drives 16 spinning up in any given stage does not exceed the maximum provided by the formula 24. In the example shown in FIGS. 8 and 9, the initial system parameters are the same as those for FIG. 7, but the drives 16 are spun up over two extra stages.

In this example, only six drives, 16.0–16.5, are spun up in stage "t0". The remaining 9 drives 16.6–16.14 are spun up over 5 successive stages. Control logic 26 includes spin up logic 40 coupled to registers 42a–42e. Registers 42a–42e are coupled to inverters 44a–44e. The inverters 44a–44e drive the signals Spin-up_A–Spin-up_E to the drivers 28 on the midplane 20. Again, the Spin-up_A–Spin-up_E signals from each controller card 18a and 18b are wire-or'd together on the midplane 20. The Spin-up_A signal is coupled to drivers 28.1, 28.2, 28.3, and 28.4, which respectively drive the Start signals Start_6_1, Start_6_2, Start_7_1, and Start_7_2 to the disk drives 16.6 and 16.7. The Spin-up_B signal is coupled to drivers 28.5, 28.6, 28.7, and 28.8, which respectively drive the Start signals Start_8_1, Start_8_2, Start_9_1, and Start_9_2 to the disk drives 16.8 and 16.9. The Spin-up_C signal is coupled to drivers 28.9, 28.10, 28.13, and 28.14, which respectively drive the Start signals Start_10_1, Start_10_2, Start_12_1, and Start_12_2 to the disk drives 16.10 and 16.12. The Spin-up_D signal is coupled to drivers 28.11, 28.12, 28.15, and 28.16, which respectively drive the Start signals Start_11_1, Start_11_2, Start_13_1, and Start_13_2 to the disk drives 16.11 and 16.13. The Spin-up_E signal is coupled to drivers 28.17 and 28.18, which respectively drive the Start signals Start_14_1 and Start_14_2 to the disk drive 16.14.

After the initial 6 drives 16.0–16.5 are spun up during stage "t0", the control logic 26 sequences the assertion of each of the Spin-up signals Spin-up_A–Spin-up_E such that each is asserted one stage after the last. Drives 16.6–16.14 are thereby spun up in stages as shown in FIG. 8 and at the bottom of FIG. 9. The first 6 drives 16.0–16.5 are spun up during "t0". Then, during "t1", the spin up logic asserts the signal Spin-up_A, resulting in the assertion of the signals Start_6_1, Start_6_2, Start_7_1, and Start_7_2 and the spin up of drives 16.6 and 16.7. During "t2", the spin up logic asserts the signal Spin-up_B, resulting in the assertion of the signals Start_8_1, Start_8_2, Start_9_1, and Start_9_2 and thus the spin up of drives 16.8 and 16.9. During "t3", the spin up logic asserts the signal Spin-up_C, resulting in the assertion of the signals Start_10_1, Start_10_2, Start_11_1, and Start_11_2 and thus the spin up of drives 16.10 and 16.11. During "t4", the spin up logic asserts the signal Spin-up_D, resulting in the assertion of the signals Start_12_1, Start_12_2, Start_13_1, and Start_13_2 and thus the spin up of drives 16.12 and 16.13. Finally during "t5" the signal Spin-up_E is asserted, resulting in the assertion of the signals Start_14_1 and Start_14_2 and thus the spin up of the final drive 16.14.

Figure 9:
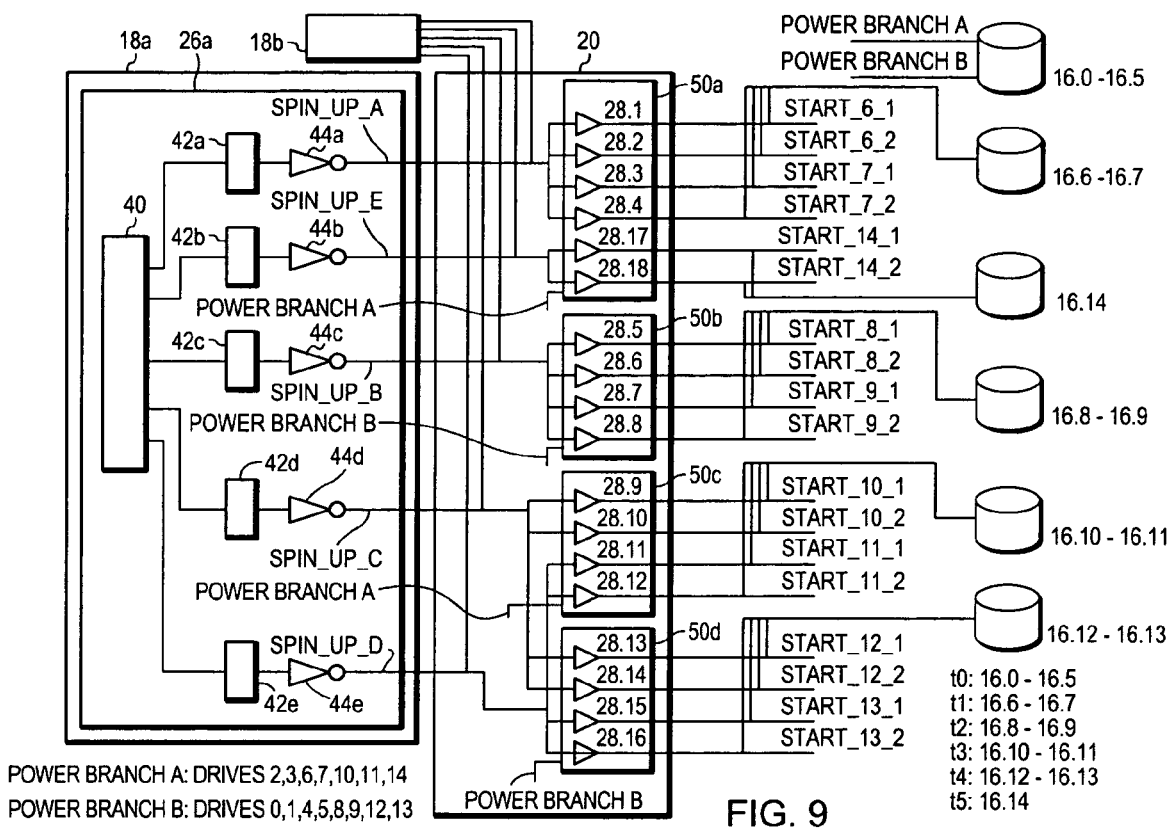
FIG. 9 is a block diagram of the control logic and midplane drivers for a system using the spin up staging shown in FIG. 8.

The example of FIG. 9 also implements the high availability features of FIG. 7. The Spin-up signals are coupled to separate single bit registers 42 and inverters 44, and the driver packages 50 are coupled to different power rails "Power Branch A" and "Power Branch B".

The control logic 26 of the previous examples can be implemented to perform the staging of the Spin-up signals in several ways. When all parameters used by the formula 24 are known to begin with, the formula can be used to pre-compute the minimum number of stages required and the maximum number of drives 16 that can be spun up in each stage. The control logic 26 can then be pre-configured to perform the resultant staging. Alternatively, the control logic 26 can be designed to measure the input parameters and execute the formula 24 dynamically. In this case, changes in the system 14 over time (e.g. number of control cards, maximum current, etc.) will by dynamically accounted for and staging will be configured in response to current system parameters.

The example of FIG. 9 will now be used to demonstrate the robustness of the spin up strategy of the invention. The system is preferably designed such that the control cards 18a and 18b can be hot-plugged. That is, when the system is powered up, control cards can be plugged into and unplugged from the system. No failures should result in either scenario.

In FIG. 10, the drive spin up sequence is shown as performed by each of the two control cards 18a and 18b when the control card 18b is plugged in after the control card 18a has begun the spin up sequencing. Remember that the Spin-up bits Spin-up_A–Spin-up_E from each control card are wire-or'd together on the midplane 20. This means that the first control card 18a or 18b to assert a Spin-up bit causes the spin up of the drives 16 associated with that Spin-up bit. In FIG. 10, the control card 18b is inserted half a stage time period after the first control card 18a powered up. For example, if control card 18a starts sequencing at "t0", then control card 18b starts sequencing at "t0+6 seconds". Half stage increments are therefore shown in the Figure for example as "t0.5", "t1.5", etc.

At "t0" the first 6 drives 16.0–16.5 spin up as previously described. At "t1" the signal Spin-up_A is asserted by the control card 18a resulting in spin up of drives 16.6 and 16.7. At "t2" the signal Spin-up_B is asserted by the control card 18a resulting in spin up of drives 16.8 and 16.9, and the sequencing of the Spin-up bits continues through Spin-up_E as previously described until all drives have spun up. Meanwhile, after the control card 18a asserts Spin-up_A at "t1", the control card 18b asserts Spin-up_A at "t1+0.5". The re-assertion of Spin-up_A by the control card 18b has no effect on the already asserted Spin-up_A signal or on the already spinning up drives 16.6 and 16.7. Likewise, the control card 18b continues to assert the Spin-up signals after the control card 18a has already asserted them, having no effect on the system. Operation of disk drive spin up thus occurs within required power parameters during a hot plug.

Now consider what happens when a user pulls the first control card 18a out of the system after the second control card 18b has been plugged in. The result is shown in FIG. 11. The first control card 18a is unplugged at "t3". After this, only the second control card 18b drives the Spin-up bits. As a result, the spin up of drives x.10–x.14 is harmlessly delayed by half a stage.

In accordance with another aspect of the invention, a method is provided for controlling the spin up of drives 16 after the system 14 has initially powered up. The drives 16 in the system are preferably hot pluggable, meaning that drives 16 can be plugged into the system not only prior to power up but also at any time after it has been powered up. After the system has been powered up and after the requisite number of spin up stages has occurred, all Start bits are asserted. Other means is therefore provided for controlling spin up of newly inserted drives.

Drives 16 in accordance with the 8045 specification accept an input called Pwr_control. When the Pwr_control signal is asserted, power is provided to the entire drive 16, including the logic board and HDA portions. When Pwr_control is deasserted, no power is provided to either the logic board or HDA. If the drive Start inputs are asserted, and the Pwr_control input is deasserted, the drive will not spin up. On the other hand, if the start bits are asserted, and then the Pwr_control input is asserted, the drive will spin up immediately in response to the assertion of Pwr_control.

Figure 12:
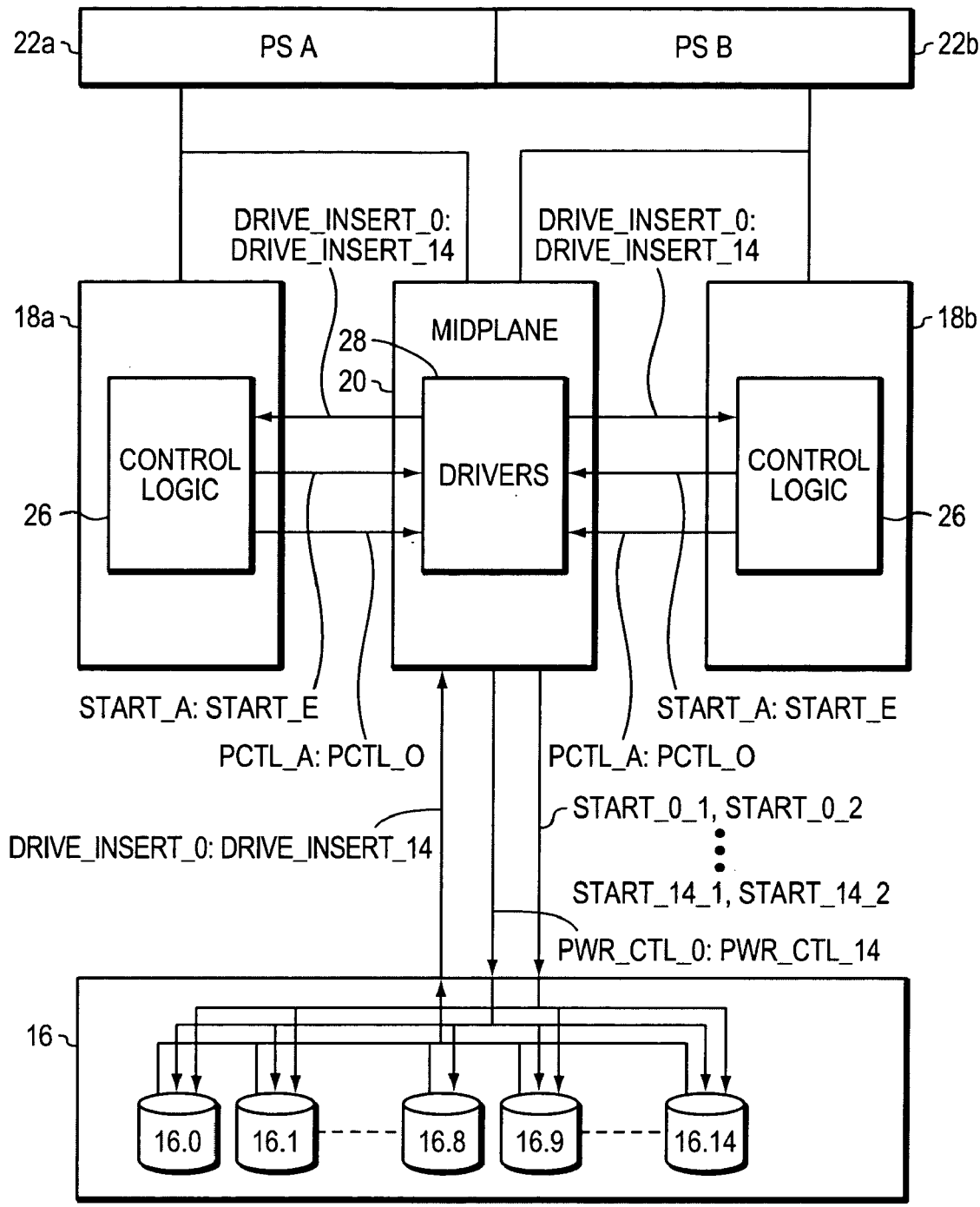
FIG. 12 is a block diagram of a storage system including the functionality of FIG. 2, wherein the control logic includes additional functionality for spinning up disk drives.

As shown in FIG. 12, the system includes the control logic as shown in FIG. 2. The control logic 26 produces in addition Pctl signals Pctl_A–Pctl_O, which are used to drive Pwr_ctl_0–Pwer_ctl_14 signals to the drives 16.0–16.14 respectively. Each drive 16.0–16.14 provides a corresponding presence signal Drive_Insert_0–Drive_Insert_14, each of which is driven to the control logic 26 on each control card 18a, 18b. When a drive is inserted into the system, the corresponding Drive_Insert signal is asserted.

Figure 13:
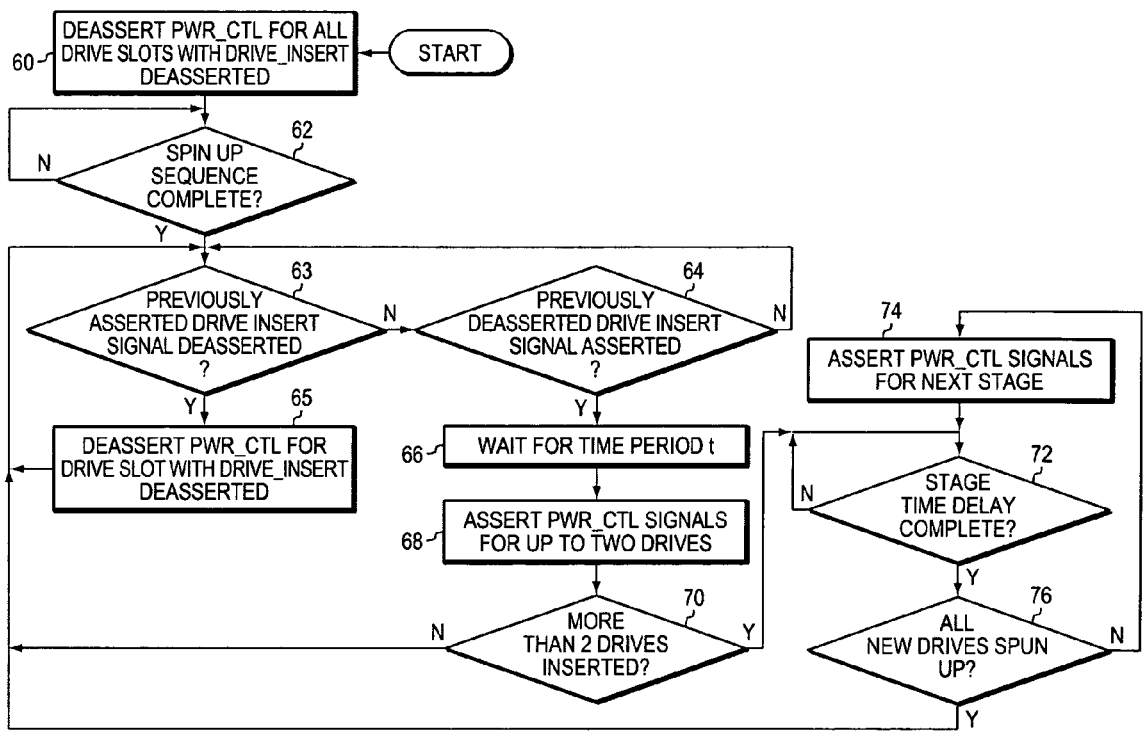
FIG. 13 is a flow diagram showing the operation of the control logic of FIG. 12 when disk drives are inserted after power up.

The additional control logic 26 functionality is shown in FIG. 13. When a control card 18a or 18b powers up, the control logic 26 first checks all Drive_Insert_0–Drive_Insert_14 signals. The control logic 26 de-asserts all Pwr_ctl signals for drives that are not inserted—i.e. drives whose Drive_Insert signals are deasserted (step 60). Spin up sequencing as previously described is then performed. If any drives 16 are inserted after all Start bits have been asserted, those drives 16 will not spin up because their corresponding Pwr_ctl bits are deasserted.

Note particularly that, as previously described with regard to the current examples, a certain number of drives, for example drives 16.0–16.5, are spun up immediately. However, if any of these drives are not installed, their corresponding Drive_Insert signals will be deasserted, causing their corresponding Pwr_ctl signals to be deasserted. If any such drives are later inserted, they are spun up as follows.

After sequencing is complete (step 62), the control logic 26 monitors the Drive_Insert signals from the drives 16. When the control logic 26 detects the deassertion of a previously asserted Drive_Insert signal (step 63), it deasserts the corresponding pwr_ctl signal for the drive slot (step 65). When the control logic 26 detects the assertion of a previously deasserted Drive_Insert signal (step 64), it waits for a time period t (step 66) to see if further drives are inserted. Upon expiration of the time period, the control logic asserts the Pwr_ctl signals for up to two newly inserted drives (step 68). If more than two drives were inserted during the time period t (step 70), then the Pwr_ctl signals corresponding to the newly inserted drives are asserted in stages two at a time until all inserted drives have been spun up. Particularly, after the initial two drives are spun up, the logic 26 waits for the expiration of the stage time period, again typically about 12 seconds (step 72). Up to two Pwr_ctl signals are asserted for the newly asserted drives 16 (step 74). This process continues until all newly inserted drives 16 have spun up (step 76). The control logic 26 then continues to monitor for newly installed or removed drives (steps 63, 64).

Figure 14:
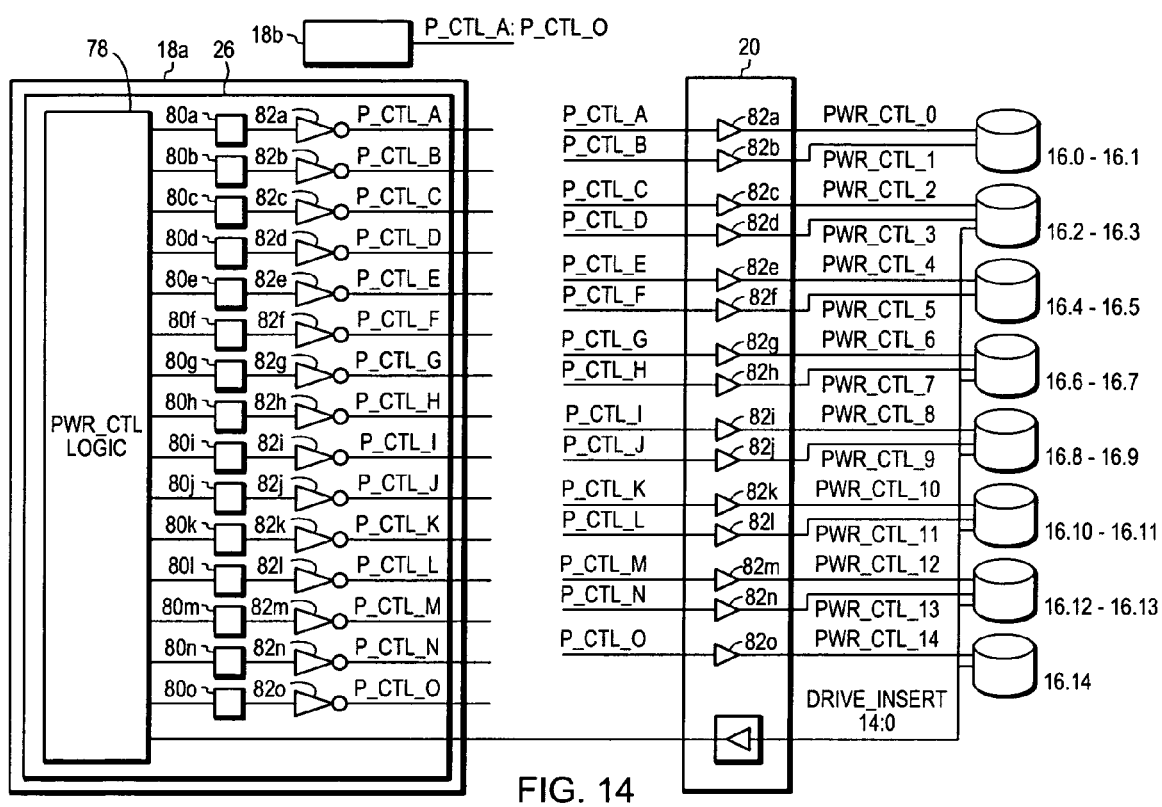
FIG. 14 is a block diagram showing the additional functionality of the control logic of FIGS. 12 and 13 and the midplane drivers.

More particularly, as shown in FIG. 14, the control logic 26 further includes power control logic 78. The power control logic 78 accepts as input the Drive_Insert_14–Drive_Insert_0 signals from the disk drives 16. The power control logic 78 drives registers 80a–80o. Each register 80a–80o drives a corresponding inverter 82a–82o. The inverters produce as output P_Ctl signals P_Ctl_A–P_Ctl_O. Each signal P_Ctl_A–P_Ctl_O is input to a corresponding driver 84a–84o on the midplane 20. The other control card 18b also produces the signals P_Ctl_1_A–P_Ctl_O, and these signals are wire-or'd to the corresponding signals from the control card 18a. The inverters 82a–82o are therefore preferably open collector drivers with pulled up outputs. The drivers 84a–84o output Pwr_Ctl signals Pwr_Ctl_0–Pwr_Ctl_14, the Pwr_control signals for corresponding disk drives 16.0–16.14. These drivers are also preferably pulled-up open collector drivers. The control logic 78 operates as shown in FIG. 13 to assert groups of the P_Ctl signals in stages as disk drives 16 are inserted into the system. Corresponding Pwr_Ctl signals are asserted in response to cause the newly inserted drives 16 to spin up in stages in groups of two.

By example, referring to FIGS. 13 and 14, a system is initialized with drive slots 16.8, 16.9, 16,10, and 16.11 empty. At power up the control logic 26 responds to the deasserted signals Drive_Insert_8–Drive_Insert_11 by deasserting the P_Ctl_I, P_Ctl_J, P_Ctl_K, P_Ctl_L signals. The Pwr_Ctl_8, Pwr_Ctl_9, Pwr_Ctl_10, and Pwr_Ctl_11 signals are deasserted on the midplane 20 in response, preventing the drives—16.8–16.11 from spinning up. Later, the four drives 16.8–16.11 are plugged into the system. The signals Drive_Insert_8–Drive_Insert_11 are now asserted. In response to the assertion of the signals Drive_Insert_8–Drive_Insert_11, the control logic 26 asserts the signals P_Ctl_I, P_Ctl_J. The signals Pwr_Ctl_8 and Pwr_Ctl_9 are asserted in response, causing the Drives 16.8 and 16.9 spin up. After waiting for the stage period of time, the control logic 26 asserts the signals P_Ctl_K and, P_Ctl_L. The signals Pwr_Ctl_10 and Pwr_Ctl_11 are asserted in response, causing the Drives 16.10 and 16.11 to spin up.

High availability mechanisms are again employed in this example. Single bit registers and inverters are used. Separate power rails, though not shown, can be incorporated in a manner similar to the example of FIG. 7.

The invention as shown in FIGS. 13 and 14 is also useful for power toggling the drives 16.0–16.14. This application is advantageous for example during error recovery. When one or more drives are inaccessible or otherwise not properly operating, software can attempt to reset the one or more drives by power-toggling them. In this case, if more than two drives are power-toggled, the staging mechanisms of FIGS. 13 and 14 will ensure that no more than two spin up at once.

The present invention is not to be limited in scope by the specific embodiments described herein. Various modifications of the present invention, in addition to those described herein, will be apparent to those of ordinary skill in the art from the foregoing description and accompanying drawings. For example, the embodiments shown use Fibre Channel drives. It will be clear to the skilled artisan that the principles of the invention can be used with any type of drive that allows separate power up of the HDA portion of the drive, and this indeed is one of the advantages of the invention. Furthermore, though the systems in the examples each support 15 disk drives, the formulas and other mechanisms of the invention clearly scale to any size storage system. All such modifications are intended to fall within the scope of the invention. Further, although aspects of the present invention have been described herein in the context of a particular implementation in a particular environment for a particular purpose, those of ordinary skill in the art will recognize that its usefulness is not limited thereto and that the present invention can be beneficially implemented in any number of environments for any number of purposes.

We claim:
1. Apparatus for use in a storage system comprising:
a plurality of disk drives;
first control logic operable to cause the disk drives to spin up in sequential stages,
wherein during each sequential stage a number of disk drives is spun up based on parameters related to the power requirements of the system; wherein the parameters comprise the maximum current for the storage system, the number of disk drives currently in steady state, the steady state current required for a disk drive, and the spin up current required for a disk drive;
wherein the number of disk drives to spin up in a stage is calculated as: (the maximum current for the storage system minus current used by logic in the system minus (the number of disk drives currently in steady state times the steady state current required for a disk drive)) divided by the spin up current required for a disk drive.

2. The apparatus of claim 1 wherein the storage system includes a maximum peak current capacity which is greater than the maximum current in order to support activation of any additional disk drives which spin up in response to a single-bit transmission error in a Spin-up signal, wherein the additional disk drives would not have spun up until a later stage but for the single-bit error.

3. Apparatus for use in a storage system comprising:
a plurality of disk drives;
first control logic operable to cause the disk drives to spin up in sequential stages,
wherein during each sequential stage a number of disk drives is spun up based on parameters related to the power requirements of the system;
wherein the parameters comprise the maximum current for the storage system, the number of disk drives currently in steady state, the steady state current required for a disk drive, and the spin up current required for a disk drive;
wherein the first control logic is operable to produce a first plurality of Spin-up signals, wherein one of the Spin-up signals is asserted in each sequential stage, wherein the Spin-up signal asserted in a stage causes a number of disk drives of the plurality of disk drives to spin up during the stage; and
second control logic producing a second plurality of Spin-up signals corresponding to the first plurality of Spin-up signals, wherein the second plurality of Spin-up signals is wire-or'd with the first plurality of Spin-up signals.

4. The apparatus of claim 3 wherein each control logic further comprises a plurality of registers corresponding to the plurality of Spin-up signals, and wherein each Spin-up signal is output from a corresponding register, and wherein each register is a single bit register.

5. The apparatus of claim 3 further comprising a plurality of power rails and a plurality of drivers, wherein each Spin-up signal is coupled to one or more drivers, and wherein a first group of drivers is coupled to a first of the plurality of power rails and a second group of drivers is coupled to a second of the plurality of power rails.

6. The apparatus of claim 3 wherein at least one of the first control logic and the second control logic, when spinning up the disk drives, is configured to provide a pre-defined sequence of disk drive startup signals, the pre-defined sequence being established prior to the activation of the storage system.

7. The apparatus of claim 3 wherein the number of disk drives to spin up in a stage is calculated as: (the maximum current for the storage system minus current used by logic in the system minus (the number of disk drives currently in steady state times the steady state current required for a disk drive)) divided by the spin up current required for a disk drive.

8. The apparatus of claim 7 wherein the storage system includes a maximum peak current capacity which is greater than the maximum current in order to support activation of any additional disk drives which spin up in response to a single-bit transmission error in a Spin-up signal of one of the first plurality of spin up signals or the second plurality of Spin-up signals, wherein the additional disk drives would not have spun up until a later stage but for the single-bit error.

9. Apparatus for use in a storage system comprising:
a plurality of disk drives;
first control logic operable to cause the disk drives to spin up in sequential stages,
wherein during each sequential stage a number of disk drives is spun up based on parameters related to the power requirements of the system;
wherein the parameters comprise the maximum current for the storage system, the number of disk drives currently in steady state, the steady state current required for a disk drive, and the spin up current required for a disk drive;
wherein the first control logic is operable to produce a first plurality of Spin-up signals, wherein one of the Spin-up signals is asserted in each sequential stage, wherein the Spin-up signal asserted in a stage causes a number of disk drives of the plurality of disk drives to spin up during the stage;
wherein each disk drive provides a presence signal that is asserted when the disk drive is present, and wherein the first control logic provides a power control signal for each disk drive that causes power to be applied to the disk drive when the power control signal is asserted, and wherein the first control logic operates to:
monitor the presence signals;
for each disk drive, if the presence signal is deasserted, deassert the power control signal;
if any deasserted presence signal becomes asserted for a disk drive, assert the power control signal for the disk drive.

10. The apparatus of claim 9 wherein the first control logic further operates such that if more than two deasserted presence signals become asserted for more than two corresponding disk drives, the control logic asserts the power control signals for the corresponding drives in sequential stages.

11. The apparatus of claim 9 wherein the number of disk drives to spin up in a stage is calculated as: (the maximum current for the storage system minus current used by logic in the system minus (the number of disk drives currently in steady state times the steady state current required for a disk drive)) divided by the spin up current required for a disk drive.

12. The apparatus of claim 11 wherein the storage system includes a maximum peak current capacity which is greater than the maximum current in order to support activation of any additional disk drives which spin up in response to a single-bit transmission error in a Spin-up signal of the first plurality of Spin-up signals, wherein the additional disk drives would not have spun up until a later stage but for the single-bit error.

13. A method for use in a storage system comprising the steps of:

providing a plurality of disk drives;
operating control logic to cause the disk drives to spin up in sequential stages,
wherein during each sequential stage a number of disk drives are spun up based on parameters related to the power requirements of the system;
wherein the parameters comprise the maximum current for the storage system, the number of disk drives currently in steady state, the steady state current required for a disk drive, and the spin up current required for a disk drive;
wherein the step of operating further comprises the step of producing a first plurality of Spin-up signals, wherein one of the Spin-up signals is asserted in each sequential stage, wherein the Spin-up signal asserted in a stage causes a number of disk drives of the plurality of disk drives to spin up during the stage;
wherein the step of operating further comprises the steps of:
providing second control logic;
producing a second plurality of Spin-up signals corresponding to the first plurality of Spin-up signals, wherein the second plurality of Spin-up signals is wire-or'd with the first plurality of Spin-up signals.

14. The method of claim 13 wherein the first control logic further comprises a plurality of registers corresponding to the plurality of Spin-up signals, and wherein each Spin-up signals is output from a corresponding register.

15. The method of claim 13 further comprising the step of:
providing a plurality of power rails and a plurality of drivers, wherein each Spin-up signal is coupled to one or more drivers, and wherein a first group of drivers is coupled to a first of the plurality of power rails and a second group of drivers is coupled to a second of the plurality of power rails, and wherein each register is a single bit register.

16. The method of claim 13 further comprising the step of calculating the number of disk drives to spin up in a stage as: (the maximum current for the storage system minus current used by logic in the system minus (the number of disk drives currently in steady state current required for a disk drive)) divided by the spin up current required for a disk drive.

17. A method for use in a storage system comprising the steps of:
providing a plurality of disk drives;
operating control logic to cause the disk drives to spin up in sequential stages,
wherein during each sequential stage a number of disk drives are spun up based on parameters related to the power requirements of the system;
wherein the parameters comprise the maximum current for the storage system, the number of disk drives currently in steady state, the steady state current required for a disk drive, and the spin up current required for a disk drive;
wherein the step of operating further comprises the step of producing a first plurality of Spin-up signals, wherein one of the Spin-up signals is asserted in each sequential stage, wherein the Spin-up signal asserted in a stage causes a number of disk drives of the plurality of disk drives to spin up during the stage;
providing a presence signal for each disk drive, the presence signal asserted when the disk drive is present;
providing by the first control logic a power control signal for each disk drive that causes power to be applied to the disk drive when the power control signal is asserted;
monitoring by the control logic the presence signals;
deasserting by the control logic the power control signal for each disk drive if the presence signal corresponding to the disk drive is deasserted;
asserting by the control logic the power control signal for a disk drive if the deasserted presence signal becomes asserted for the disk drive.

18. The method of claim 17 further comprising the step of:
operating the control logic such that if more than two deasserted presence signals become asserted for more than two corresponding disk drives, asserting the power control signals for the corresponding drives in sequential stages.

19. The method of claim 17 further comprising the step of calculating the number of disk drives to spin up in a stage as: (the maximum current for the storage system minus current used by logic in the system minus (the number of disk drives currently in steady state current required for a disk drive)) divided by the spin up current required for a disk drive.

20. A program product comprising a computer readable medium having embodied therein a computer program for storing data, the computer program comprising:
first control logic operable to cause the disk drives of a plurality of disk drives to spin up in sequential stages, wherein during each sequential stage a number of disk drives is spun up based on parameters related to the power requirements of the system;
wherein the parameters comprise the maximum current for the storage system, the number of disk drives currently in steady state, the steady state current required for a disk drive, and the spin up current required for a disk drive;
wherein the first control logic is operable to produce a first plurality of Spin-up; signals, wherein one of the Spin-up signals is asserted in each sequential stage, wherein the Spin-up signal asserted in a stage causes a number of disk drives of the plurality of disk drives to spin up during the stage; and
second control logic producing a second plurality of Spin-up signals corresponding to the first plurality of Spin-up signals, wherein the second plurality of Spin-up signals is logically or'd with the first plurality of Spin-up signals.

21. The program product of claim 20 wherein at least one of the first control logic and the second control logic controls the number of disk drives to spin up in a stage based on the calculation: (the maximum current for the storage system minus current used by logic in the system minus (the number of disk drives currently in steady state times the steady state current required for a disk drive)) divided by the spin up current required for a disk drive.

22. A program product comprising a computer readable medium having embodied therein a computer program for storing data, the computer program comprising:
first control logic operable to cause the disk drives of a plurality of disk drives to spin up in sequential stages, wherein during each sequential stage a number of disk drives is spun up based on parameters related to the power requirements of the system;
wherein the parameters comprise the maximum current for the storage system, the number of disk drives currently in steady state, the steady state current required for a disk drive, and the spin up current required for a disk drive;
wherein the first control logic is operable to produce a first plurality of Spin-up; signals, wherein one of the Spin-up signals is asserted in each sequential stage, wherein the Spin-up signal asserted in a stage causes a number of disk drives of the plurality of disk drives to spin up during the stage;

wherein each disk drive provides a presence signal that is asserted when the disk drive is present, and wherein the first control logic provides a power control signal for each disk drive that causes power to be applied to the disk drive when the power control signal is asserted, and wherein the first control logic operates to:

monitor the presence signals;

for each disk drive, if the presence signal is deasserted, deassert the power control signal;

if any deasserted presence signal becomes asserted for a disk drive, assert the power control signal for the disk drive.

23. The program product of claim 22 wherein the first control logic further operates such that if more than two deasserted presence signals become asserted for more than two corresponding disk drives, the control logic asserts the power control signals for the corresponding drives in sequential stages.

24. The program product of claim 22 wherein the first control logic controls the number of disk drives to spin up in a stage based on the calculation: (the maximum current for the storage system minus current used by logic in the system minus (the number of disk drives currently in steady state times the steady state current required for a disk drive)) divided by the spin up current required for a disk drive.

* * * * *